US006474446B1

(12) United States Patent
Greenlaw et al.

(10) Patent No.: US 6,474,446 B1
(45) Date of Patent: *Nov. 5, 2002

(54) CARGO ELEVATOR ASSEMBLY

(76) Inventors: Robert J. Greenlaw, 9209 Stagecoach, Houston, TX (US) 77041; Robert E. Greenlaw, 9209 Stagecoach, Houston, TX (US) 77041

( * ) Notice: Subject to any disclaimer, the term of this patent is extended or adjusted under 35 U.S.C. 154(b) by 4 days.

This patent is subject to a terminal disclaimer.

(21) Appl. No.: 09/605,502

(22) Filed: Jun. 28, 2000

Related U.S. Application Data

(63) Continuation-in-part of application No. 09/250,532, filed on Feb. 16, 1999, now Pat. No. 6,328,525, which is a division of application No. 08/587,224, filed on Jan. 16, 1996, now Pat. No. 5,931,262, and a continuation-in-part of application No. 08/475,950, filed on Jun. 7, 1995, now Pat. No. 5,915,913, application No. 08/587,224, which is a continuation-in-part of application No. 08/475,950.

(51) Int. Cl.[7] .................................................. B60P 1/02
(52) U.S. Cl. ........................ 187/244; 187/249; 187/255; 414/679
(58) Field of Search ................................. 187/244, 249, 187/251, 255; 414/800, 809, 812, 495, 539, 679

(56) References Cited

U.S. PATENT DOCUMENTS

| 1,297,619 A | 3/1919 | Wessmann |
|---|---|---|
| 1,931,237 A | 10/1933 | O'Connell |
| 2,611,640 A | 9/1952 | Francis |
| 2,832,636 A | 4/1958 | Black |
| 3,051,335 A | 8/1962 | Bartlett |
| 3,119,350 A | 1/1964 | Bellingher |
| 3,368,704 A | 2/1968 | Pope |
| 3,786,947 A | 1/1974 | Craft, III |
| 4,015,686 A | 4/1977 | Bushnell, Jr. |
| 4,139,109 A | 2/1979 | Murphy |
| 4,627,784 A | 12/1986 | Collins |
| 4,642,018 A | 2/1987 | Leroux et al. |

(List continued on next page.)

FOREIGN PATENT DOCUMENTS

| EP | 196-924 | 10/1986 | ................. 410/29.1 |
|---|---|---|---|
| FR | 1.353.904 | 1/1964 | ................. 414/529 |
| JP | 61-155037 | 7/1986 | ................. 414/495 |
| SU | 1119-958 | 10/1984 | ................. 187/249 |
| WO | 88/00538 | 1/1988 | ................. 414/495 |
| WO | 94/02337 | 2/1994 | ................. 414/495 |

*Primary Examiner*—Eileen D. Lillis
*Assistant Examiner*—Thuy V. Tran
(74) *Attorney, Agent, or Firm*—Akin, Gump, Strauss, Hauer & Feld, LLP

(57) ABSTRACT

A cargo delivery vehicle has storage for multiple tiers, or levels, of cargo. The delivery vehicle includes a plurality of interior pallet elevators, at least one on either side of a center structural wall running parallel to the side walls. Specialized pallets are provided for use with the pallet elevators. The pallet elevators are powered by redundant hydraulic cylinders which drive four cross-shaft-linked chains to lift and lower the pallet support shelves. Compact rear access doors slide vertically to allow easy access for loading or unloading. Substantially continuous side access doors provide total exterior access to the lowermost tier of cargo by delivery vehicle personnel standing on the ground. Cargo stored at the upper tier may be positioned by an elevating means at the level of the lower tier for either rear loading or side retrieval purposes. The longitudinal center structural wall supports a plurality of transverse diagonal braces that extend from approximately the mid-point of the center structural wall to the upper outboard corners of the outer sidewall frames. This framing system greatly reduces the structural requirements of the side walls and floor, thereby permitting largely open outboard wall framing for multiple side access ports as well as a reduced floor thickness to permit easier access from the pavement.

22 Claims, 15 Drawing Sheets

U.S. PATENT DOCUMENTS

| | | |
|---|---|---|
| 4,668,142 A | 5/1987 | Fity et al. |
| 4,701,086 A | 10/1987 | Thorndyke |
| 5,036,951 A | 8/1991 | Frangos |
| 5,092,721 A | 3/1992 | Prince |
| 5,096,216 A | 3/1992 | McCalla |
| 5,207,333 A | 5/1993 | Peng |
| 5,443,350 A | 8/1995 | Wilson |
| 5,466,030 A | 11/1995 | Harris et al. |
| 5,505,581 A | 4/1996 | Gearin et al. |
| 5,685,228 A | 11/1997 | Ehrlich et al. |
| 5,915,913 A * | 6/1999 | Greenlaw et al. ........... 414/679 |
| 5,931,262 A * | 8/1999 | Greenlaw et al. ........... 187/244 |

* cited by examiner

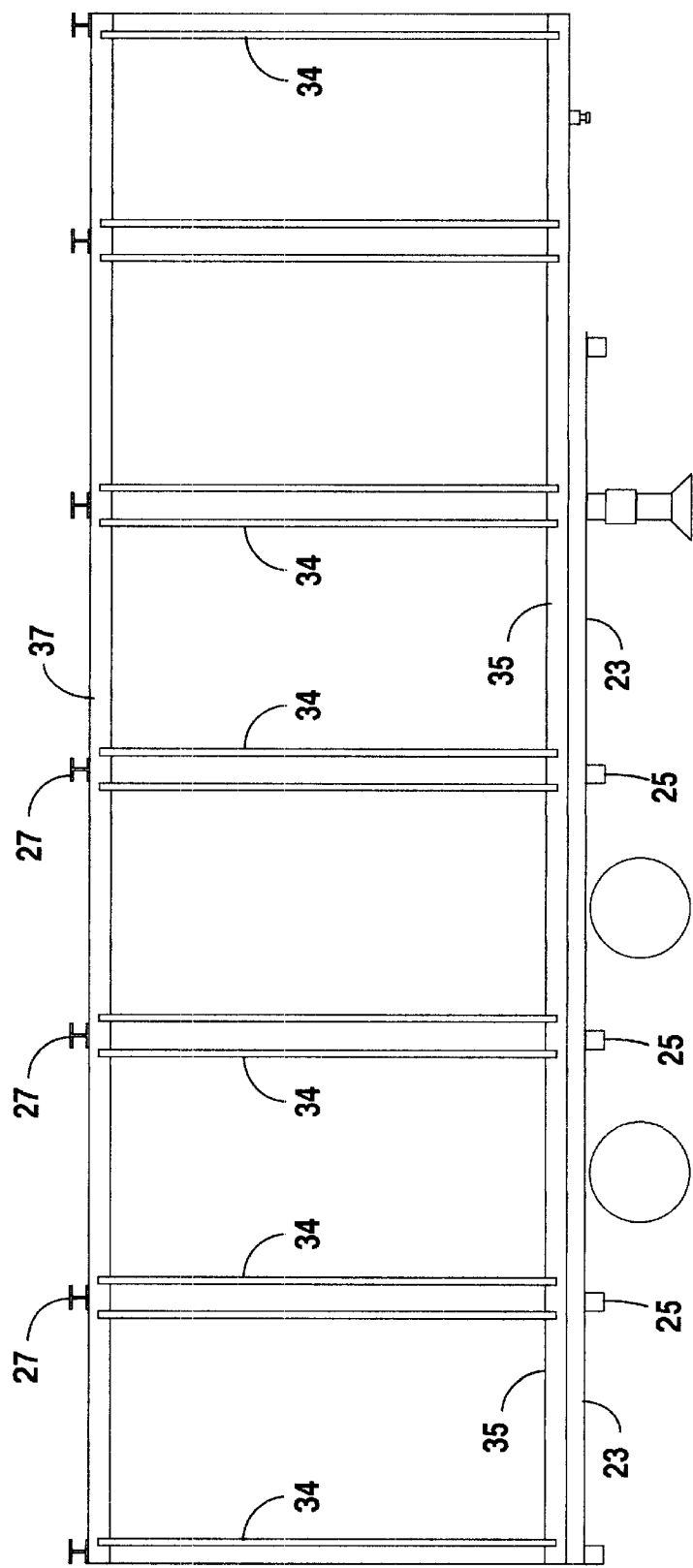

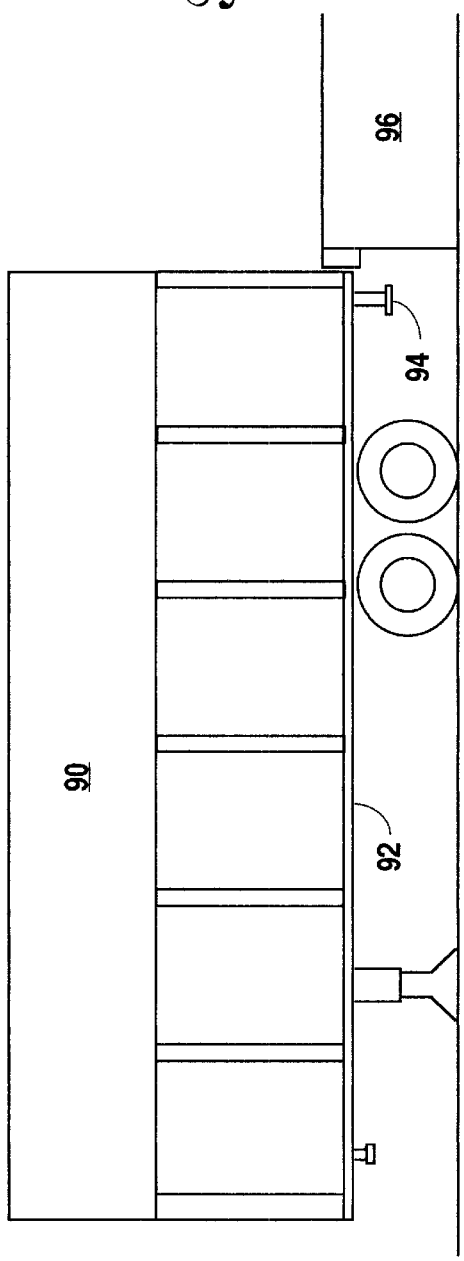
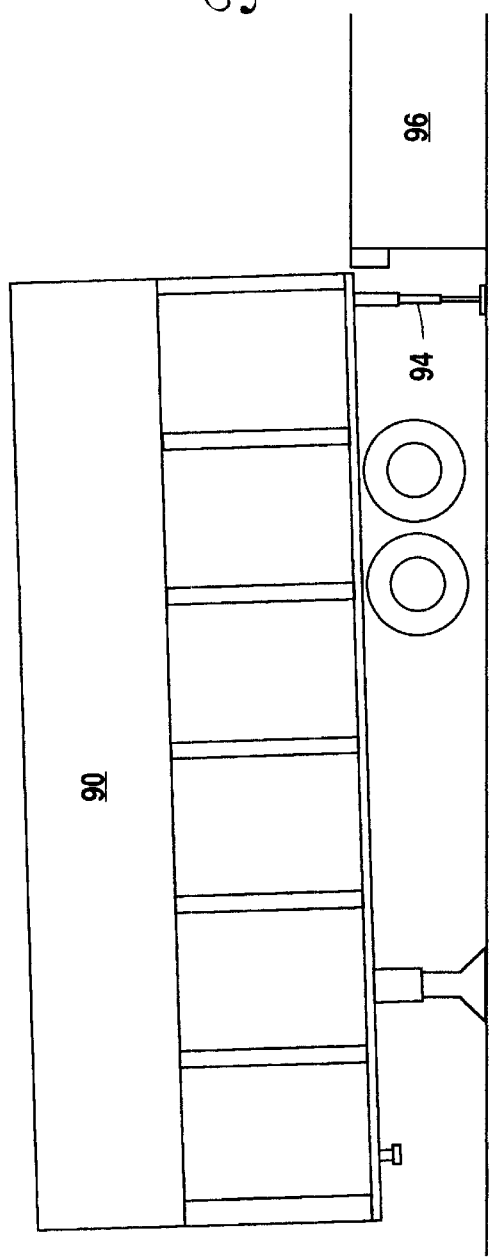

CARGO ELEVATOR ASSEMBLY

This application is a continuation-in-part of our application Ser. No. 09/250,532 filed Feb. 16, 1999 now U.S. Pat. No. 6,328,525, which is in turn a divisional of application Ser. No. 08/587,224, filed Jan. 16, 1996, and issued as U.S. Pat. No. 5,931,262, and a continuation-in-part of application Ser. No. 08/475,950 filed Jun. 7, 1995, and issued as U.S. Pat. No. 5,915,913. application Ser. No. 08/587,224 was also a continuation-in-part of application Ser. No. 08/475,950.

FIELD OF THE INVENTION

The invention relates to cargo delivery vehicles. More particularly, the invention relates to cargo delivery vehicles having multiple tiers of cargo storage which can be easily accessed for loading purposes through the rear doors, and can be unloaded through side access doors without requiring total bodily entry into the delivery vehicle in order to retrieve any portion of the cargo.

It is desirable to store and transport a wide variety of cargo in vehicles having multiple storage tiers so that the most efficient use of the interior space in the vehicle can be made. In many distribution industries, single tier delivery vehicles suffer from several disadvantages resulting in the inability to utilize the full vertical capacity of the cargo area. One such disadvantage is that stacking cargo to excessive heights introduces potential payload instability. A second disadvantage is that excessive stacking often results in cumbersome access for manual unloading. A third disadvantage of excessive cargo stacking is that upper cargo may crush lower cargo.

It is also desirable in many distribution applications to utilize a delivery vehicle engineered to produce the structural versatility to both (1) accept palletized cargo through rear doors, as from a warehouse dock, and (2) permit total and random side access to cargo at multiple delivery stops without the inefficiencies or hazards associated with unloading personnel being required to enter the vehicle in order to effect total cargo retrieval.

Typically, the feature of rear loading and random-access side unloading are mutually exclusive in the known art of enclosed delivery vehicle construction. Some delivery vehicles in the food service industry provide rear loading with only limited side access, thus requiring total bodily entry to the vehicle in order to fully unload. This arrangement may achieve advantageous loading capabilities, yet suffer from unloading inefficiencies. Conversely, delivery vehicles common to the beverage distribution industry often permit total exterior access to the cargo areas through multiple side doors for unloading, but they are structurally unsuitable for rear loading.

It is still further desirable to provide an elevating means for raising and lowering cargo such that both an upper and lower tier may be loaded or unloaded from the lower level. Total exterior access to all cargo may be preferably achieved via side doors permitting access to multiple sections of the lower level. The elevating means may then provide the capability to lower upper tier cargo to the side-accessible lower level for retrieval.

Multi-tier storage of cargo is well known in the art. For example, it is known to provide upper and lower fixed storage platforms in a multi-tier cargo storage vehicle, as described in U.S. Pat. No. 4,139,109 issued Feb. 13, 1989 to Murphy. A single rear elevator apparatus used to vertically transfer cargo between fixed tiers, as disclosed in the patent to Murphy, possesses the disadvantage that a fixed upper tier cargo platform may prohibit loading personnel from entering the rear of the vehicle to facilitate the forward conveyance of cargo through the interior of the vehicle. Likewise, cargo vehicles with fixed tiers can not provide random access to all tiers of cargo through side access doors positioned at the lowermost tier.

A variety of specialized interior elevator arrangements have been developed to overcome the disadvantages of exterior lift mechanisms and fixed tiers for multi-tier storage. For example, U.S. Pat. No. 2,832,636 issued Apr. 29, 1958 to Black, discloses the use of a single interior elevator platform extending the length of the cargo storage space, which enables the transportation of cargo in two tiers. Segmented platforms formed by multiple adjoining elevators have also been proposed such as in U.S. Pat. No. 4,701,086 issued Oct. 20, 1987 to Thorndyke. These segmented platforms provide two-tier storage in certain segments and single-tier storage in other segments where tall cargo is to stored. A similar segmented platform lift apparatus in a multi-tier double drop trailer has been disclosed in U.S. Pat. No. 5,092,721 issued Mar. 3, 1992 to Prince.

But these vehicles with interior elevators are structurally limited to receiving and delivering cargo through rear doors only. As in the arrangement shown by Murphy, the forward cargo is inaccessible while the aft cargo is in place. Such an arrangement may provide a spatially efficient means of transporting cargo between destinations; however, they may be ill-suited for adaptation to delivery applications in which cargo retrieval efficiency is a primary concern. Modern distribution systems frequently require the transportation of cargo from a warehouse to multiple delivery stops where unloading efficiency can be greatly enhanced by direct and random access to the entire lower tier through a series of side doors and where an elevating means can also sequentially position individual upper tier cargo platforms at the lower tier level.

A further disadvantage of the vehicles disclosed by Black, Thorndyke, and Prince is that they have elevating cargo platforms that extend transversely the full width of the vehicles' interior. Although full-width elevating platforms can thereby accept cargo up to eight feet wide, it may be more desirable for cargo portions to be longitudinally divided and independently accessible such that cargo placed within a lower tier cargo portion must reside within the average workman's arm's reach, so that his body may remain substantially outside of the delivery vehicle. Accordingly, a half-width elevating means may reduce the workman's susceptibility to fatigue and injury, since he need not bodily enter the vehicle to load or unload cargo.

In conventional enclosed delivery vehicles having single-tier or multi-tier storage, the floor is typically required to bear the weight of the cargo and transfer those forces transversely through the floor and longitudinally through the side wall members to the vehicle's axles. The requirement for numerous, closely spaced structural members in the side walls may limit the availability of sizable doors for cargo access from the side of the vehicle. Some conventional vehicles offer limited side access through doors penetrating the side walls, but the structural integrity of such vehicles may be drastically reduced. Therefore, it is desirable to minimize the load-bearing requirements of the side wall of the delivery vehicle in order to afford virtually continuous side access to the cargo.

Moreover, in the construction of enclosed delivery vehicles, the load-bearing floor is typically required to be quite thick for adequate structural support, thereby decreasing the interior space for storage. Therefore, it is also desirable to minimize the load-bearing requirements of the floor of the delivery vehicle in order maximize interior storage space, especially space located in the ergonomically advantageous lower zone of the truck or trailer.

Other problems and disadvantages of prior art systems can be appreciated by one skilled in the art after examination of such prior art and in view of the present disclosure.

SUMMARY OF THE INVENTION

The shortcomings of the prior art create a need for an enclosed, multi-tier delivery vehicle in which all tiers can be loaded and unloaded from the lowermost tier. Other shortcomings of the prior art create a need for a multi-tier delivery vehicle that provides multiple side access ports through which the entirety of the cargo can be manually unloaded without requiring unloading personnel to bodily enter the vehicle, or that permits direct and simultaneous exterior access to cargo located at the lowermost tier, or that can be loaded completely through rear doors of the vehicle and unloaded completely through side doors of the vehicle. A multi-tier delivery vehicle providing. one or more of such features may allow the vehicle to carry a double cargo payload. The structure of the upper tier cargo platform keeps the weight of the upper cargo from damaging crushable lower cargo, thus allowing a delivery vehicle to minimize its wheelbase and turning radius by carrying an increased payload capacity in weight per unit of area.

Further advantages over the prior art may be obtained by providing a multi-tier delivery vehicle with a low floor height so that the contents of the delivery vehicle are within arm's reach of the average delivery worker on the ground, yet providing means to elevate the tiers to the standard dock loading or unloading height.

Still further advantages over the prior art may be obtained by providing an enclosed, multi-tier delivery vehicle in which the cargo storage area is longitudinally bisected in order that cargo portions may remain within arm's reach of a side wall access door. The cargo portions may be bisected by structures selected to reduce the load-bearing requirements of the side walls and floors, thus permitting greater side access to cargo and minimizing the vertical height of the floor. The bisecting structure may also be enhanced to provide a heat exchange cavity to circulate air between warm and cool zones, and thereby independently regulate the temperature of different cargo bays within the delivery vehicle.

Even further benefits may be obtained by eliminating the structural flooring of the multiple tiers and replacing it instead with shelves for suspending the pallets of cargo above a lower tier. Depending on the elevator position, full-floor platforms can interfere with loading and unloading by forcing persons entering the lower tier of the delivery vehicle to stoop to avoid the platform floor of the second tier. In delivery vehicles with a plurality of elevators, uneven flooring will result if the forward elevators are raised while the rear elevators remain in the lower position. Eliminating such flooring provides a continuous walkway regardless of the elevator position.

It is also advantageous that any elevating means incorporated into a delivery vehicle be redundantly safe to operate, compact to install in the delivery vehicle, and capable of mechanically locking the cargo in position during travel and unloading.

Additional benefits may be found by using one or more compact sliding rear doors, opposed to conventional swing-out or roll-up style doors, saving space, weight, and the inconvenience of opening doors prior to approaching a delivery dock.

Different aspects of the present invention provide improved loading and unloading capability for cargo delivery vehicles by addressing the deficiencies of, and providing the aforementioned advantages and benefits over, the prior art.

According to one aspect of the invention there is provided an enclosed transport vehicle having at least an upper and lower tier in vertical alignment for cargo storage. An upper tier may be lowered with an elevating system in order to facilitate loading or unloading of cargo.

According to a second aspect of the invention, there is provided an enclosed transport vehicle having a plurality of independently operable elevating systems of the type described and having an interior cargo storage area which is longitudinally bisected by a center structural wall such that the elevated cargo adjoins other elevated cargo transversely across said center wall and at least one other elevated cargo in a longitudinal direction.

According to a third aspect of the invention, there is provided an enclosed transport vehicle having a plurality of adjoining elevating cargo systems and being structurally adapted to accept cargo loaded through rear access doors while also permitting simultaneous exterior access to cargo unloaded through a plurality of side access doors.

According to a fourth aspect of the invention, there is provided a lifting mechanism comprising a plurality of pallet-support shelves powered by hydraulic cylinders.

According to a fifth aspect of the invention, there is provided a mechanism to stop the pallet from falling should a failure occur in the hydraulic system.

According to a sixth aspect of the invention, there is provided a special pallet for loading onto the pallet support shelves, the pallet having rollers mounted on the four corners of the pallet to expedite the movement of the pallet down the aisle of the truck. Also provided are dead bolts integral to the pallet that may be bolted through the apertures in the pallet support shelf and into the side and center walls of the delivery vehicle to lock the pallet into place.

According to a seventh aspect of the invention, there is provided an enclosed transport vehicle having a plurality of adjoining elevating systems and multiple side access ports which can be entirely and manually unloaded through the sides without requiring personnel to completely enter the vehicle's interior in order to retrieve any portion of the cargo.

According to an eighth aspect of the invention, there is provided an enclosed transport vehicle having a plurality of adjoining elevating systems in which the load-bearing requirements of the side walls are substantially shifted to a longitudinally bisecting center wall.

According to a ninth aspect of the invention, there is provided an enclosed transport vehicle having a plurality of adjoining elevating systems in which the load-bearing requirements of the elevated cargo suspended from the outboard roof structure are substantially shifted to diagonal support beams which carry these outboard loads inward to the center structural wall.

According to a tenth aspect of the invention, there is provided a cooling system for and a heat transfer system between the cargo bays created by a longitudinally bisecting center wall.

According to an eleventh aspect of the invention, there is provided a means to raise the transport vehicle's floor to that of regular loading dock height.

According to a twelfth aspect of the invention, there is provided a compact set of vertically sliding rear-access doors.

BRIEF DESCRIPTION OF THE DRAWINGS

The invention will be more clearly understood after reference to the following detailed specification read in conjunction with the drawings, wherein:

FIG. 2a shows a multi-tier delivery vehicle backed up to a loading dock ready to receive cargo with elevating systems positioned down for walk-through loading.

FIG. 2b shows a first set of cargo loaded onto an elevating system positioned at the lower tier level.

FIG. 2c shows a first set of cargo raised to the upper tier level on an elevating system.

FIG. 2d shows a second set of cargo loaded onto a lower tier section underneath the raised first set of cargo.

FIG. 2e shows a third set of cargo loaded onto an elevating system positioned at the lower tier level.

FIG. 2f shows a third set of cargo raised to the upper tier level by means of an elevating system.

FIG. 2g shows a forth set of cargo loaded onto a lower tier section underneath the raised third set of cargo.

FIG. 2h shows the vehicle loaded to capacity, wherein additional cargo sets have been loaded in a front to rear progression.

FIG. 2i shows cargo located on the lower tier accessible for retrieval through a first side of the vehicle.

FIG. 2j shows cargo, previously transported in the upper tier, now positioned at the lower tier level and accessible for retrieval through a first side of the vehicle.

FIG. 2k shows cargo located on the lower tier accessible for retrieval through a second side of the vehicle.

FIG. 2l shows cargo, previously transported in the upper tier, now positioned at the lower tier level and accessible for retrieval through a first side of the vehicle.

FIG. 2k shows cargo located on the lower tier accessible for retrieval through a second side of the vehicle.

FIG. 2l shows cargo, previously transported on the upper tier, now positioned at the lower tier level and accessible for retrieval through a second side of the vehicle.

FIG. 3c is a side view of the multi-tier delivery vehicle's primary structural framing.

FIG. 9a is a side view of a trailer backed up to a dock.

FIG. 9b is a side view of the trailer of FIG. 9a raised to dock height for loading.

DETAILED DESCRIPTION

Figure 1:
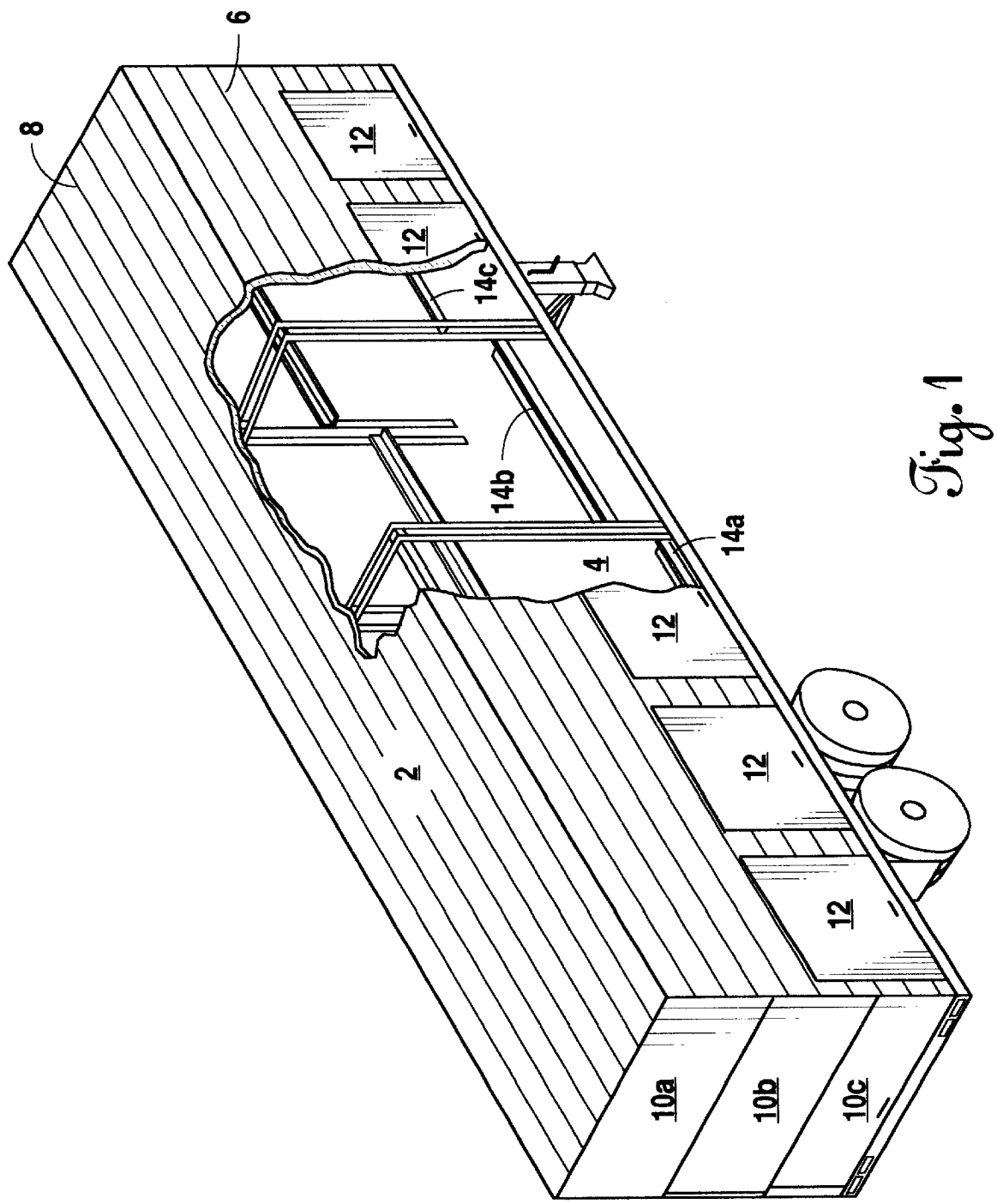
FIG. 1 is a cut-away perspective view of a multi-tier delivery vehicle of the present invention generally showing adjoining elevator assemblies arranged in the vehicle's interior.

An embodiment of the present invention is illustrated in FIG. 1, which shows a delivery vehicle 2 of the semi-articulated trailer type that may be operatively coupled to a motorized tractor means for transport. The delivery vehicle 2 includes a plurality of independently operable, adjoining elevator assemblies for raising and lowering cargo such as pallets stacked with packages or merchandise. The delivery vehicle 2 is enclosed by side walls 6 and roof 8 to protect cargo and vehicle mechanisms from the elements, and may be insulated for use in the distribution of temperature-sensitive food products. All cargo may be loaded through vertically. sliding rear doors 10a, 10b, and 10c, transported on either an upper or lower tier, and unloaded through multiple side access doors 12. The side access doors 12 are preferably provided in each side wall 6 so as to permit substantially continuous lengthwise exterior access to all cargo positioned at the lower tier level. The lower tier consists of cargo placed at or on the vehicle floor 4, and every elevating platform may travel between floor level and upper tier level. Specifically, elevating platform 14a is shown as a pair of pallet support shelves positioned at floor level for the receiving of cargo through the rear doors 10 or for the delivery of cargo through the side access doors 12. Elevating platform 14c is in the upper tier position for the transportation and storage of cargo, and elevating platform 14b is shown in motion midway between the floor and upper tier levels.

Figure 2A:
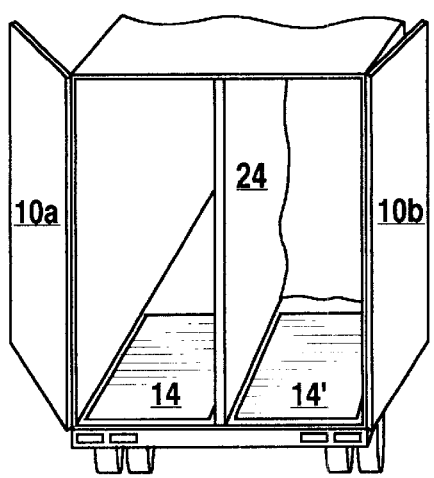
FIGS. 2a–2l show a sequence wherein all tiers of cargo are loaded through rear doors and all tiers of cargo are unloaded through side doors.

The loading and unloading sequence can be more readily understood from the embodiment shown in FIGS. 2a through 2l. In FIG. 2a, the delivery vehicle is shown backed up and ready to receive cargo, as from a warehouse loading dock. Traditional swing-out doors 10 are shown for simplicity in place of vertically sliding rear access doors. Elevating platforms 14 and 14' are positioned at the lower tier to permit walk-through loading—here, shown comprising board-like, full-floor platforms instead of dual pallet support shelves. It will be understood, as illustrated in FIG. 1, that walk-through loading would be permitted regardless of the elevation of the platform if pallet support shelves, rather than board-like platforms, are used. Loading personnel may manually push or otherwise steer cargo portions to convey cargo forward through the interior of the vehicle. Cargo bays on either side of the center structural wall 24 are loaded sequentially in front-to-rear progression.

Figure 2B:
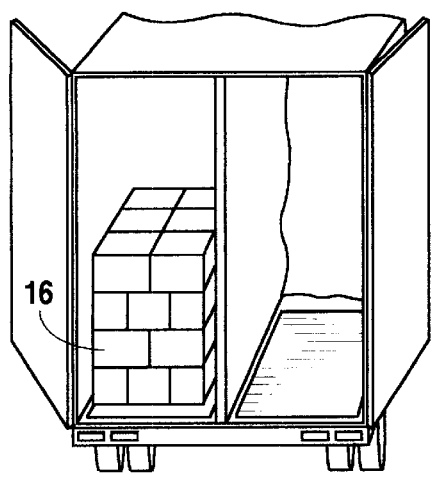
Figure 2C:
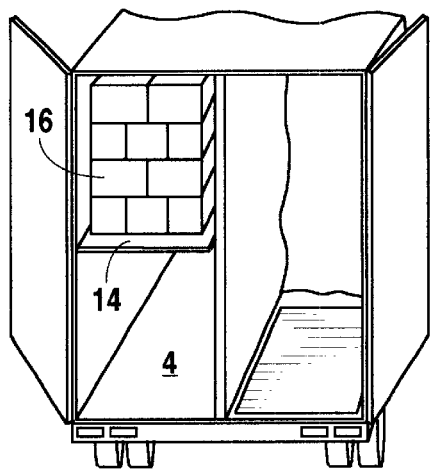
Figure 2D:
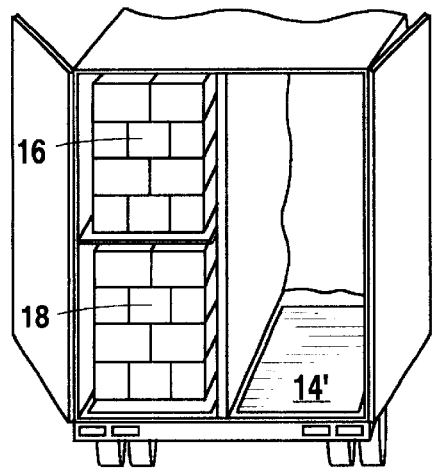
Figure 2E:
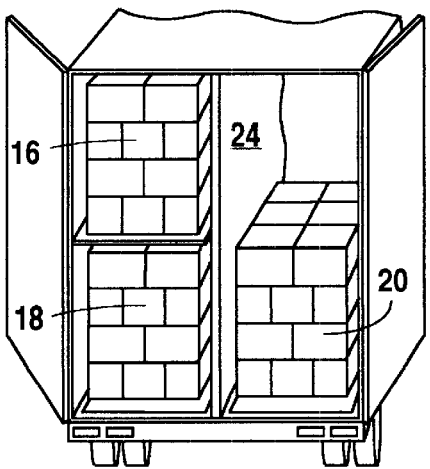
Figure 2F:
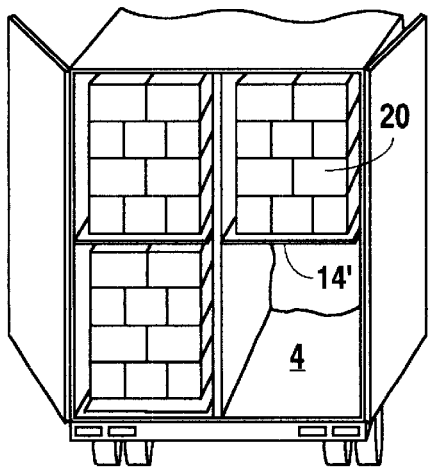
Figure 2G:
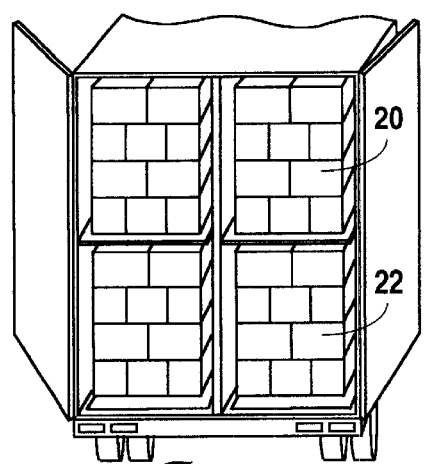

FIG. 2b shows the start of a loading cycle of the rearmost cargo bays, as if all forward bays have been previously loaded in a similar fashion. Onto elevating system 14 a first cargo pallet 16 is loaded. In a manner hereinafter described, elevating system 14 is raised to an upper tier position as shown in FIG. 2C. Cargo pallet 16 may then be placed beneath a second cargo pallet 18 onto the vehicle's floor 4 as shown in FIG. 2d. In FIG. 2e, a third cargo pallet 20 is loaded onto the elevating system 14' in the bay transversely opposite the center structural wall 24. FIG. 2f shows third cargo pallet 20 raised on the elevating system 14' with an elevating means, allowing a fourth cargo pallet 22 to occupy the lower tier in FIG. 2g.

Figure 2H:
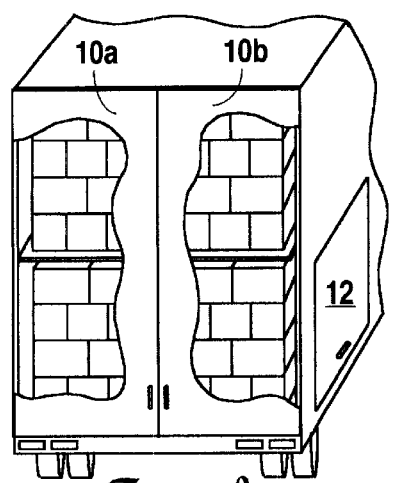
Figure 2I:
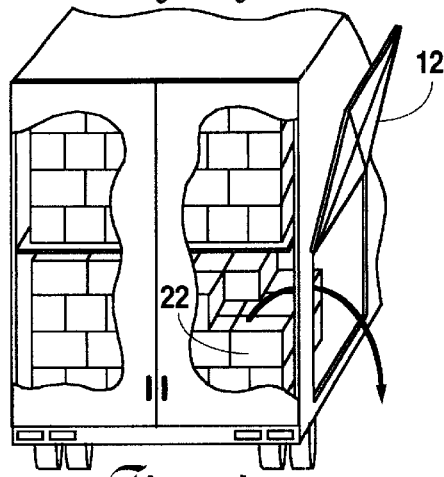
Figure 2J:
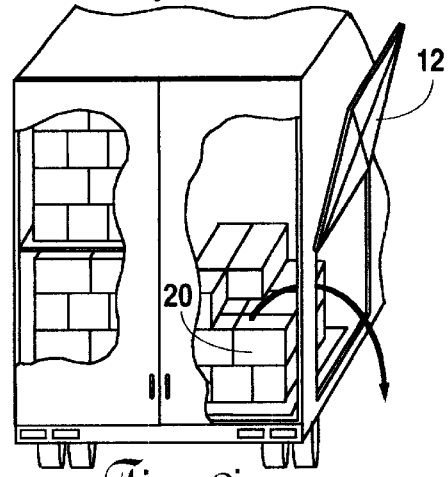
Figure 2K:
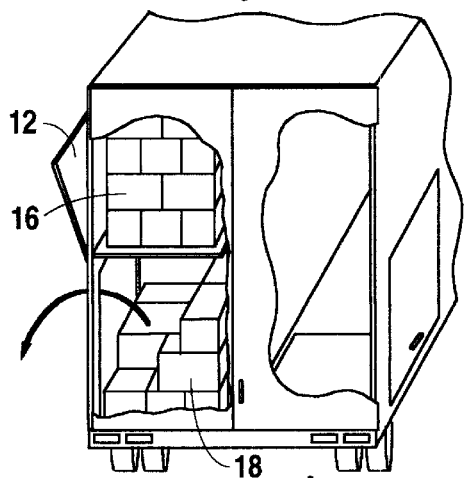
Figure 2L:
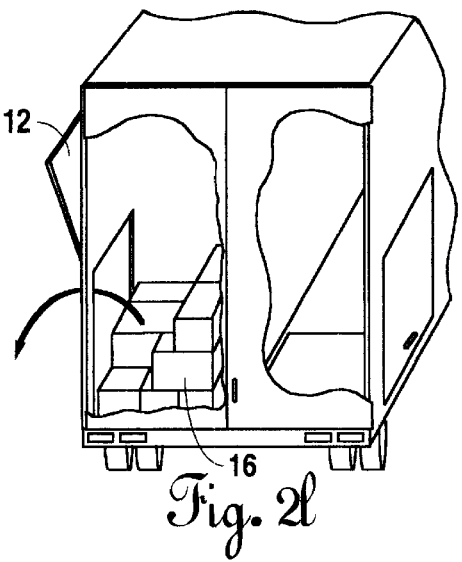

In FIG. 2h, the delivery vehicle is loaded to capacity and ready to distribute cargo at multiple locations. Side access doors 12 provide access to each cargo bay at the lower tier level. FIG. 2l shows fourth cargo pallet 22 being unloaded through side access door 12 at a delivery stop. In FIG. 2j, the lower tier has been fully unloaded and the third cargo pallet 20 has been lowered for unloading. Likewise, on the opposite side of the vehicle, the second cargo pallet 18 may be unloaded through a side access door 12 as in FIG. 2k and then the first cargo pallet 16 descend to occupy the accessible lower tier for future unloading as in FIG. 2l.

It will be readily understood that the foregoing sequence can be used with pallet support shelves rather than board-like platforms. It will also be readily understood that the foregoing sequence can be reversed so that loading is accomplished through the side doors and unloading is accomplished through the rear doors. Likewise, it will be readily apparent that all loading and unloading may be performed through rear doors only. Also, it can be seen that all loading and unloading may be accomplished via side doors only. In summary, any combination of rear or side access is permitted for both loading and unloading cargo.

The center structural wall 24 (FIG. 2a) is nominally disposed so as to bisect the transverse dimension of the delivery vehicle, creating two cargo areas of roughly equal size. Because of the permanent longitudinal division created by said center structural wall 24, cargo portions are necessarily limited in transverse width to a dimension somewhat less than half of the legal over-the-road width regulation. Likewise, the use of cargo elevators to mechanically position all tiers of cargo in turn to the elevation of the lowermost tier restricts the height needed to unload the cargo to a dimension somewhat less than half of the legal height limit plus half the height of the tires. Thus, all cargo may be mechanically positioned substantially within the average worker's arm's reach when the worker is standing on the pavement. Additionally, the provision of side access doors at every elevator bay for cargo retrieval permits manual access to the entire payload area without requiring total bodily entry into the vehicle. This design increases safety and productivity of delivery personnel and mitigates the ergonomic concerns of unloading a delivery vehicle. It is to be understood, however, that less than all of the cargo in the lowermost tier may be accessible through side access doors if it is not desired to furnish the vehicle with side access doors along its entire length.

Figure 3A:
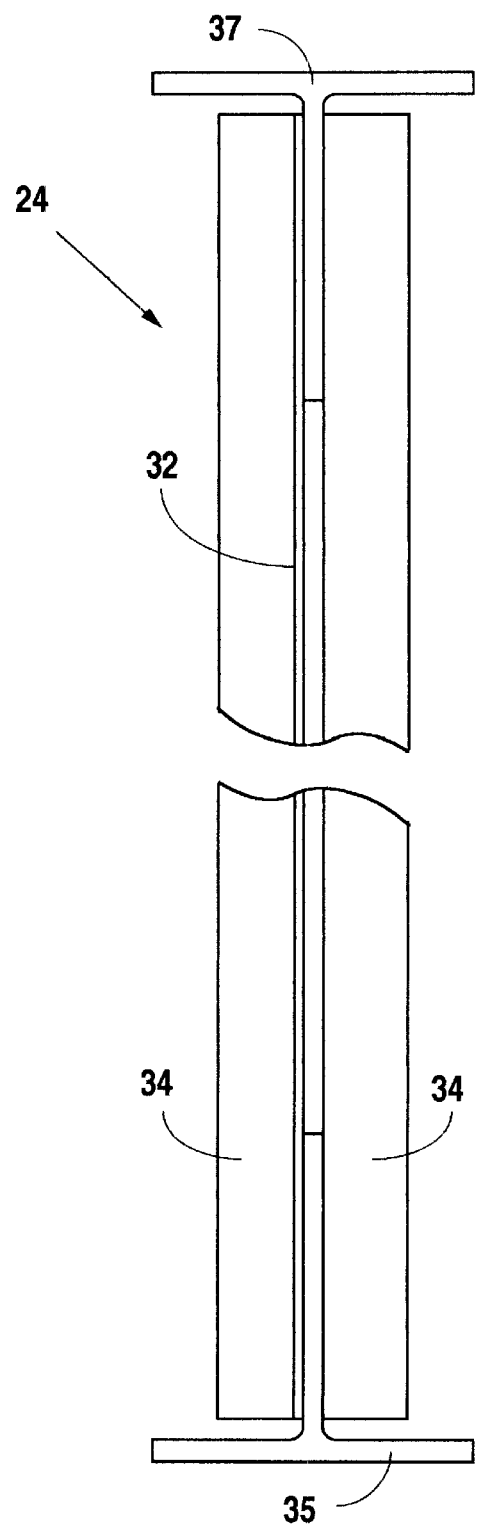
FIG. 3a is an end view of a center structural wall of the multi-tier delivery vehicle with associated framing.

The exemplary embodiment provides a structural support frame that reduces the need for a thick, load bearing floor. FIG. 3a is an end view of the center structural wall 24 of the structural support frame. The center structural wall 24 comprises vertical center posts 34 for carrying compressive loads, attached to top and bottom caps 37 and 35. A skin 32 of sheet metal spans the top and bottom caps 37 and 35, separating the cargo area into two zones.

Figure 3B:
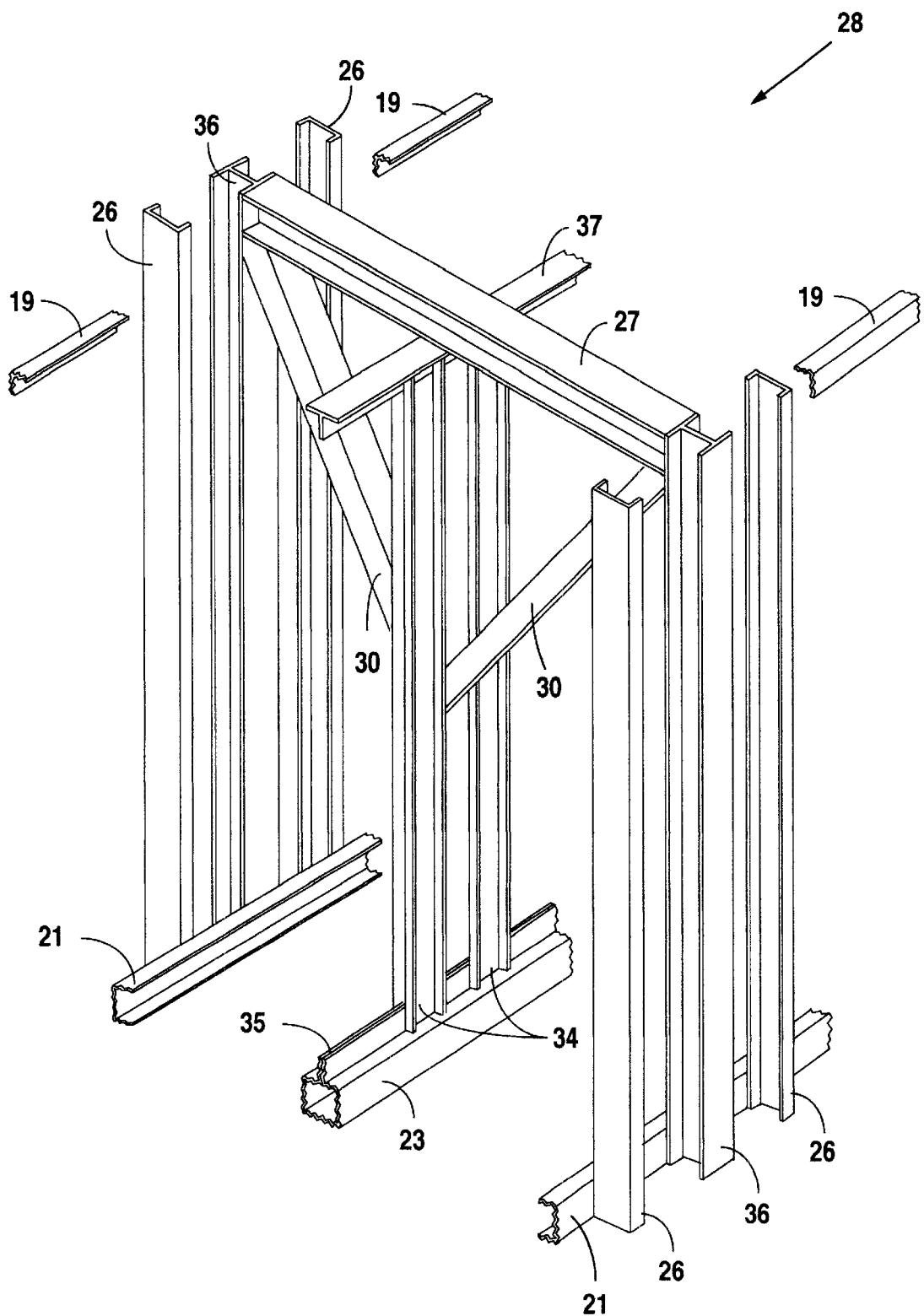
FIG. 3b is a perspective view of a portion of the multi-tier delivery vehicle's structural framing.

FIG. 3b is a perspective view of a portion of the structural support frame 28. To improve the clarity of the drawing, the skin 32 of FIG. 3a is not shown in FIG. 3b. The structural support frame comprises a horizontal transverse roof beam 27 connected to two vertical side support members 36. The top cap 37 of the structural center wall 24 (FIG. 3a) is mated to a midpoint of the horizontal transverse roof beam 27. Vertical side floater members 26 are provided on either side of and connected to the vertical side support members 36 by horizontal longitudinal upper and lower channel braces 19 and 21.

Transverse diagonal braces 30 carry loads from the upper outboard intersections of the horizontal transverse roof beam 27 with the main vertical side members 36 to midpoints of vertical center posts 34. These loads are further transferred by the vertical center posts 34 to a longitudinal square floor beam 23 and from there to the vehicle's axles (not shown). The load-carrying capacity of the main structural support frame 28 greatly reduces the structural requirements of the side walls and floor, thereby permitting largely open outboard wall framing for multiple side access ports as well as a minimized floor thickness to permit easier access from the ground.

FIG. 3c is a side view of the trailer cut away at the structural center wall 24 (FIG. 3a) to reveal the full longitudinal span of the structural framing. Horizontal transverse floor beams 25 are provided near the bottom of the trailer frame, to which the vehicle axles and landing gear are attached. The longitudinal floor beam 23 lies across and on top of the transverse floor beams 25. The bottom cap 35 of the structural center wall 24 lies parallel with and on top of the longitudinal floor beam 23. The center vertical posts 34 extend from the bottom cap 35 to the top cap 37. Horizontal transverse roof beams 27 span overhead.

Figure 3D:
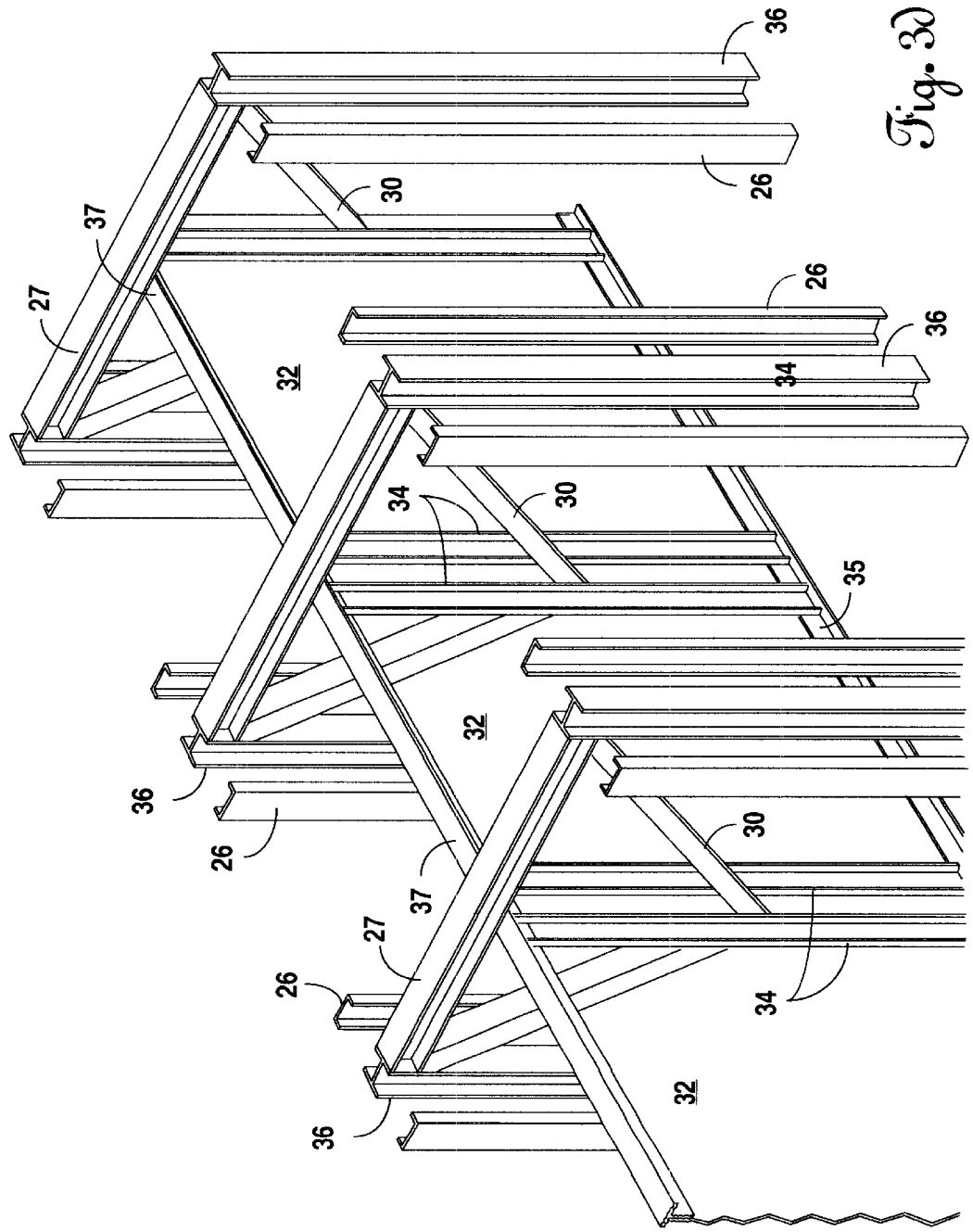
FIG. 3d is a second perspective view of a portion of the structural support frame of the multi-tier delivery vehicle also showing the center structural wall.

FIG. 3d is a second perspective view of a greater portion of the structural support frame 28, with the skin 32 attached. The relatively small spacing between each vertical side floater member 26 and its adjacent vertical side support member 36 creates a vertical recess for housing a hydraulic cylinder and lifting chains, and for housing and guiding a pallet support shelf lifting arm. The combination of the structural support frame 28 and center structural wall is a lightweight yet durable structural configuration with great ability to handle both elevated and floor loads.

Figure 4A:
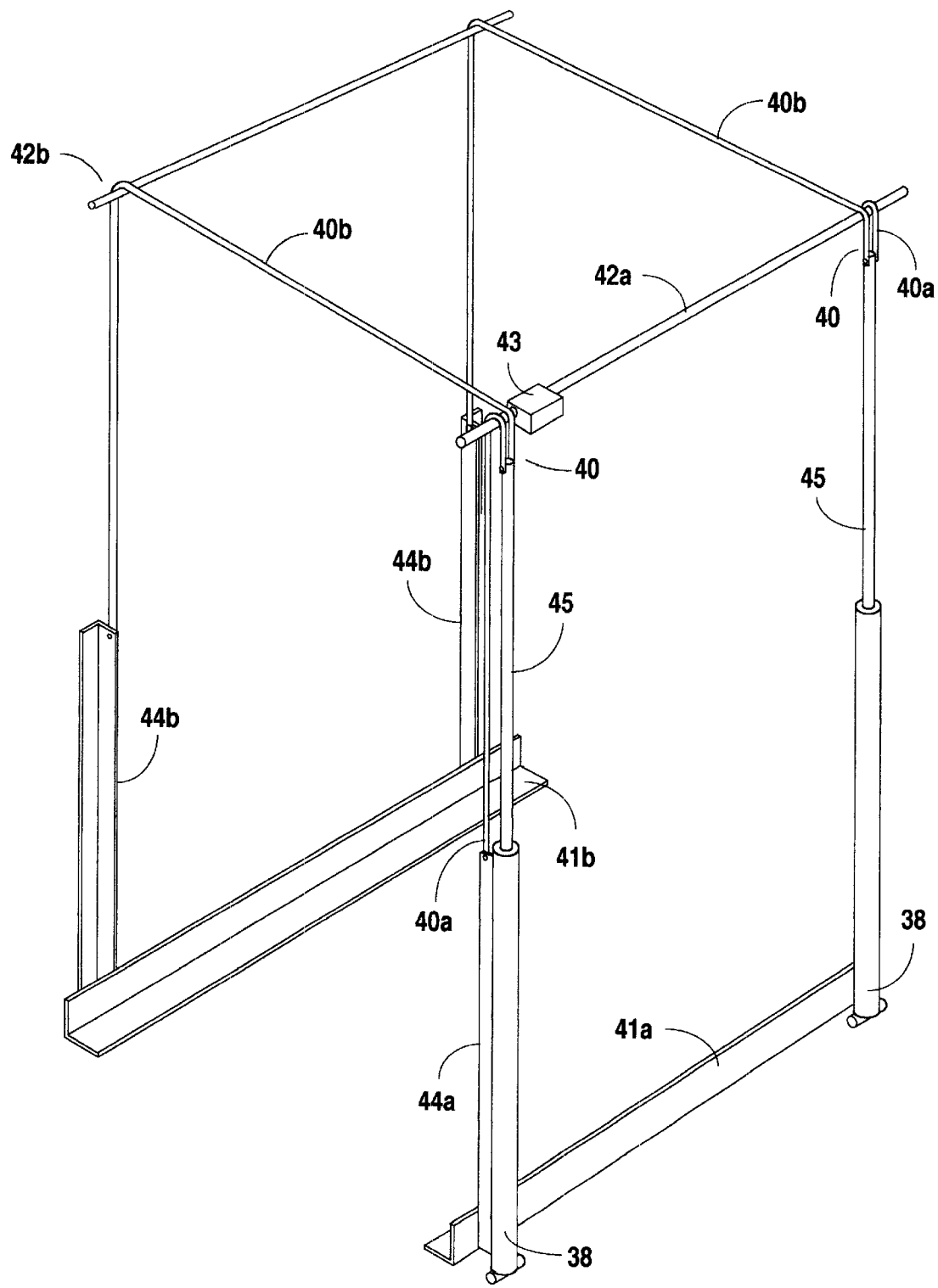
FIG. 4a is a perspective view of a hydraulically powered lifting mechanism.
Figure 4B:
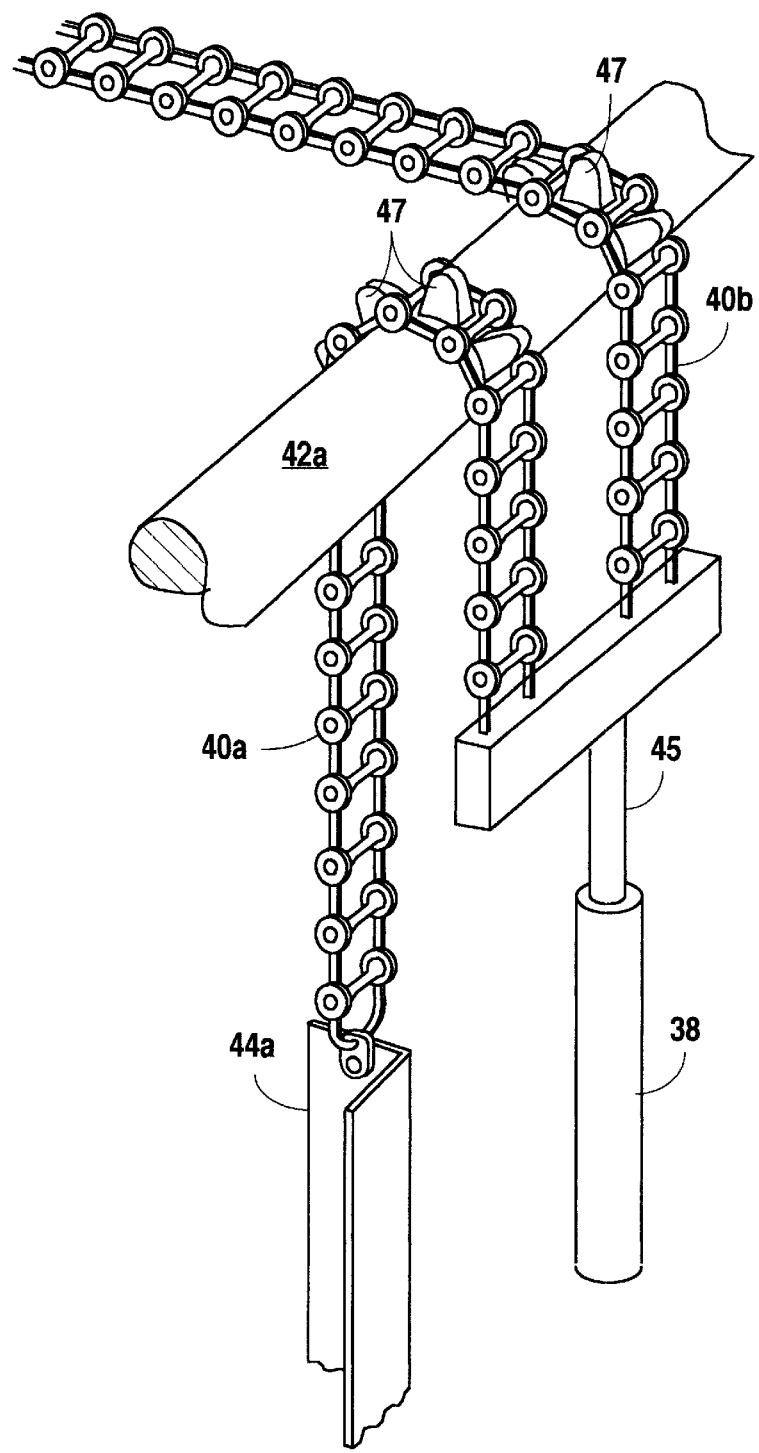
FIG. 4b is an exploded perspective view of one end of a cross shaft synchronizing the movement of two of the four chains used in the lifting mechanism of FIG. 4a for lifting the pallet support shelves.

FIGS. 4a and 4b illustrate the lifting mechanism of the present invention. Redundant hydraulic cylinders 38 are stationed in the side walls of the transportation vehicle between the vertical side support members 36 and the vertical side floater members 26 (FIG. 3d). The dual hydraulic assemblage is actuated by a single hydraulic pump (not shown). Each hydraulic ram 45 is connected to two chains 40a and 40b which pivot about a rotating cross shaft 42a. Chain 40b turns 90 degrees about the cross shaft 42a, extends transversely across the top of the elevator system structure, turns 90 degrees about another pivot member 42b, and drops down to a connection with the top of a first support shelf lifting arm 44b. Chain 40a pivots a full 180 degrees about the cross shaft 42, and is connected to a second support shelf lifting arm 44a opposite the first support shelf lifting arm 44b. The support shelf lifting arms 44a and 44b are linked, by means of a lifting clip, to opposite pallet support shelves 41a and 41b.

FIG. 4a shows a total of four chains 40a and 40b, linked by a cross shaft 42a, to lift each pair of pallet support shelves. FIG. 4b shows one end of the cross shaft 42a in greater detail. The cross shaft 42a is studded with sprockets 47 to interface with and mechanically link the chains together, forcing them to advance and retreat synchronously even if loads have not been distributed evenly to each corner of the pallet support structure. The combination of the cross shaft 42 and chains 40a and 40b induces lockstep synchronicity in the lifting and lowering of the dual pallet support shelves 41a and 41b.

The use of the cross shaft 42a also facilitates the installation of a locking mechanism 43 (FIG. 4a) which fixes the shaft in place, thereby retaining the lifting mechanism in its raised position. The locking mechanism 43 prevents loaded pallet support shelves from dropping in the event that the hydraulic lifting means fails. The locking mechanism 43 may be comprised of ratchet and pawl machinery, or other methods of locking, as would be familiar to those skilled in the art.

Figure 5:
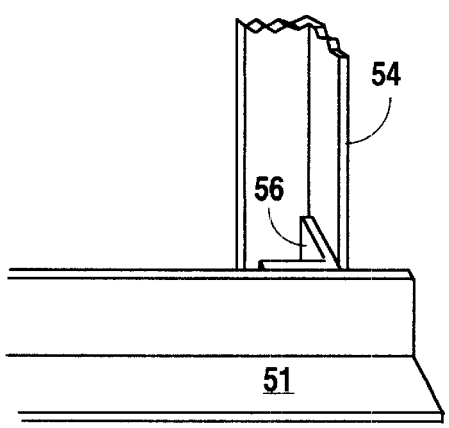
FIG. 5 is a perspective view of the connections between a pallet support shelf, a shelf lifting arm, and a lifting clip.

FIG. 5 is an exploded view of the connection between a pallet support shelf 51 and the shelf lifting arm 54. The use of a pair of longitudinally-spaced pallet support shelves, one along the side wall and one along the center wall, provides several advantages over pallet support platforms. It provides a continuous walkway through the truck regardless of the elevator position if no pallet occupies the support shelves. It also makes it easier to clean the vehicle and reduces the weight of the elevator and the amount of material needed to construct the elevators. In a loading operation, a pallet is placed on a pair of opposite pallet support shelves 51 and then raised to the desired height.

The dual pallet support shelves 51 are supported by the synchronized chains 40a and 40b (FIG. 4a) by means of four shelf lifting arms 54 (two per pallet support shelf). The shelf lifting arms 54 are coupled to the ends of the two pallet support shelves 51 by means of a lifting clip 56. The lifting clip 56 allows the shelf lifting arms 54 to be recessed into the side walls of the elevator frame structure, between the vertical side floater and support members 26 and 36 (FIG. 3b).

Figure 6A:
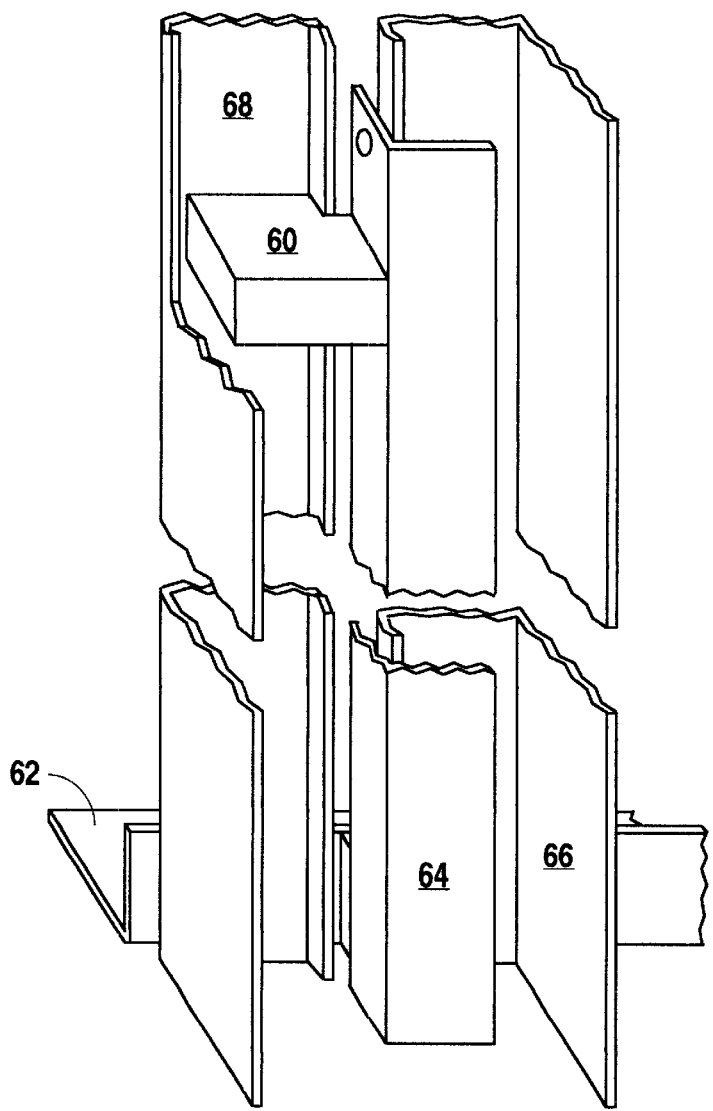
FIG. 6a is a perspective view of vertical guide rails and guides located on the lifting arm of FIG. 5.

FIG. 6a is a perspective view of the interface between the shelf lifting arm 54 of FIG. 5 and a pair of vertical side support and floater members. Shelf lifting arm 64 is recessed between the vertical side floater member 68 (which corresponds to vertical side floater member 26 (FIG. 3d)) and the vertical side support member 66 (which corresponds to vertical side support member 36). A guide member 60 is attached to a shelf lifting arm 64 that fits within the vertical side floater member 68. In this view, the lifting clip 56 (FIG. 5) is obscured, but an anterior view of support shelf 62 is visible. The frame member 68 acts as a rail in which the guide member 60 slides up and down. The combination of the shelf lifting arm 64, the guide 60, and the frame member 68 keeps a raised pallet from swaying by counteracting the moments and transverse and longitudinal forces produced by vehicular motion and unbalanced loads on the pallet.

Figure 6B:
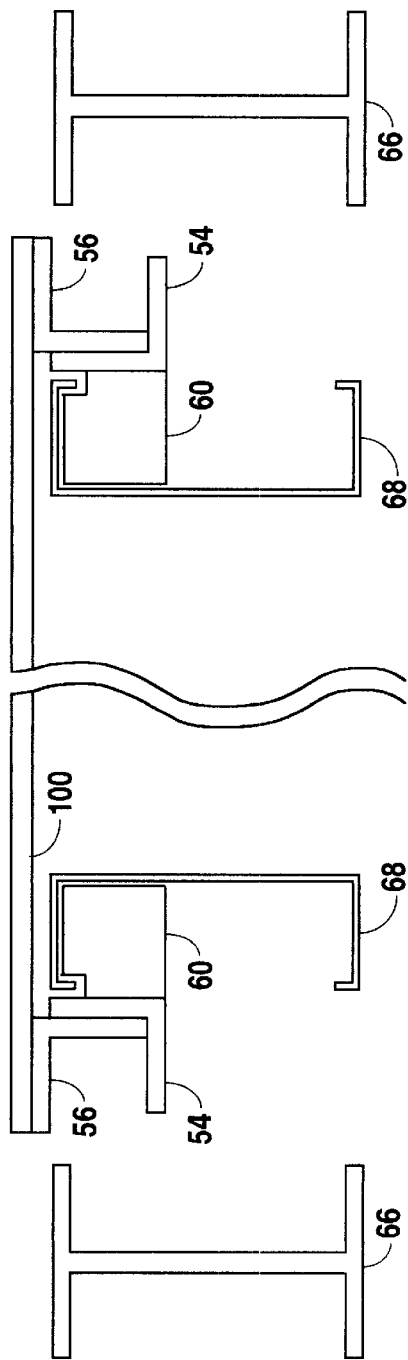
FIG. 6b is a top view of the vertical flange of a first pallet support shelf, a lifting clip, and vertical side support members of the structural support frame.

FIG. 6b is a top view of the vertical flange of a pallet support shelf, a lifting clip, and vertical side support members of the structural support frame. FIG. 6b illustrates vertical side floater members 68 positioned nearby vertical side support members 66. Guide member 60 slides vertically within vertical side floater member 68, carrying shelf lifting arm 54, to which it is connected, with it. Lifting clip 56, in turn, is connected to the vertical flange 100 of a first pallet support shelf (only partially shown).

Figure 6C:
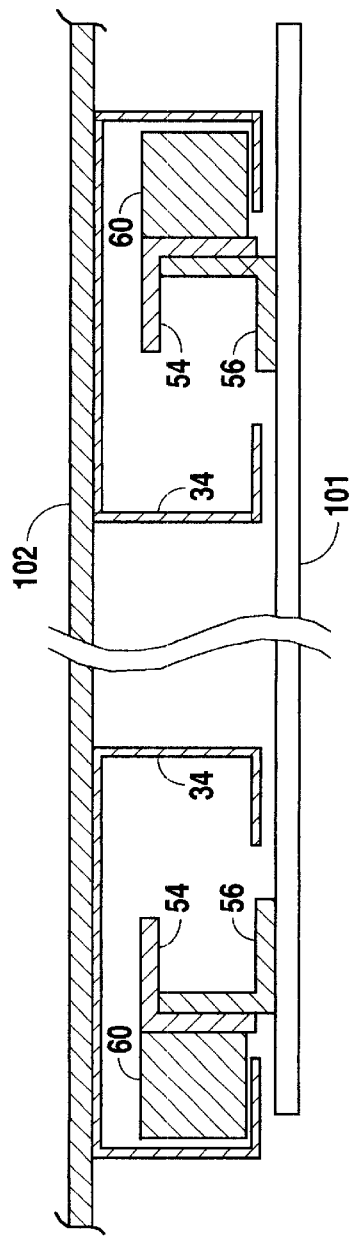
FIG. 6c is a top view of the vertical flange of second pallet support shelf opposing the first pallet support shelf, a lifting clip, and vertical center posts of the structural support frame.

FIG. 6c is a top view of the vertical flange of a second pallet support shelf, a lifting clip, and the vertical center posts of the structural support frame. FIG. 6c illustrates two center vertical posts 34 attached to the vertical stem 102 of the top cap 37 of FIG. 3a. As in FIG. 6b, guide member 60 carries shelf lifting arm 54, to which it is connected, with it as it slides vertically within vertical posts 34. Lifting clips 56, in turn, carry the vertical flange 101 of a second pallet support shelf (only partially shown), which is opposite the first pallet support shelf of FIG. 6b.

Figure 7:
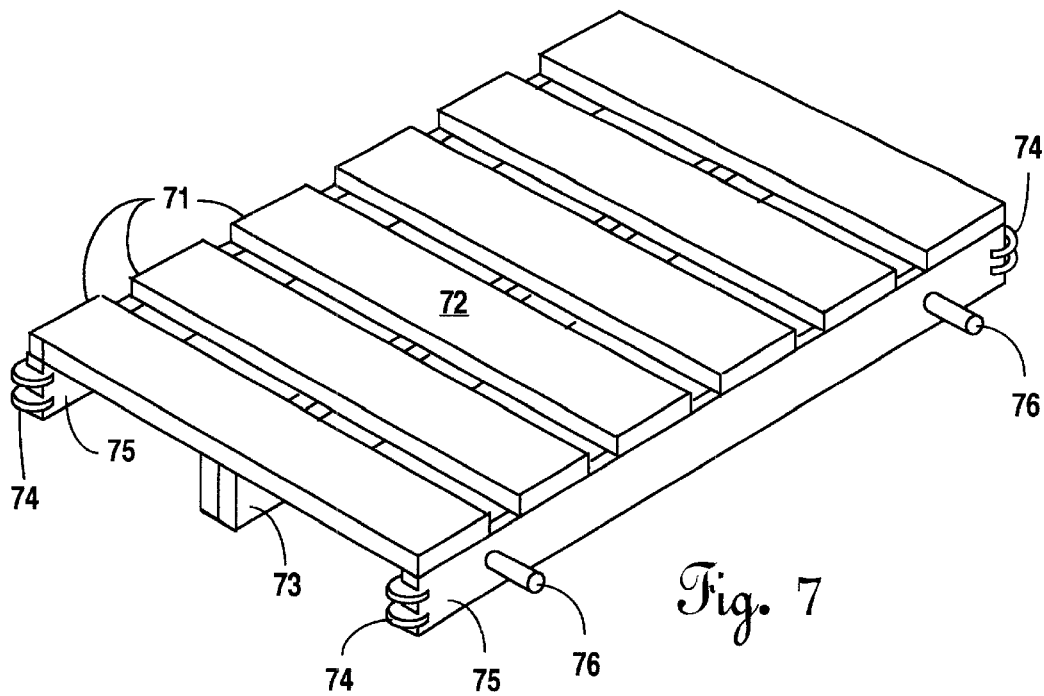
FIG. 7 is a view of a custom pallet with guiding rollers and dead bolt locks.

FIG. 7 illustrates a specialized pallet 72 for use with the elevator assembly of the present invention. The pallet 72 is shown having two longitudinal side braces 75 and a center brace 73 overlaid by a plurality of planks 71 in the transverse direction. The side braces 75 are spaced apart to fit on and be carried by pallet support shelves 51 (FIG. 5). In order to facilitate the movement of the pallet down the aisle of the truck, it is beneficial to have rollers 74 mounted on each end of the side braces 75 defining the four corners of the pallet 72. Also shown are dead bolts 76 mounted on the side braces 75 for locking the pallet 72 into place. These dead bolts 76 may be thrown through apertures (not shown) in the pallet support shelves 51 (FIG. 5) and into the side 6 (FIG. 1) and center wall 24 (FIG. 2a) of the delivery vehicle 2 for locking the pallet 72 and pallet support shelf 51 to the structural frame of the delivery vehicle 2.

The Groceries Manufacturers Association (GMA) utilizes a pallet with 40 inch by 48 inch dimensions. The dimensions of the 40 inch by 48 inch pallet perfectly accommodates a layer of eight 12 inch by 20 inch product cases. However, these dimensions are less than perfect when such cases are layered in basketwoven fashion on the pallet to improve stability during transportation. While the odd layers fit the 40 inch by 48 inch pallet perfectly, the even layers—in which boxes are rotated 90 degrees about a vertical axis—have dimensions of 36 inches (3 times 12 inches) and 40 inches (2 times 20 inches), resulting in a large volume of unused cargo capacity.

A more optimal use of cargo capacity can be achieved using pallets with 40 inch by 60 inch dimensions. Odd layers of standard 12 inch by 20 inch product cases would fit the pallet perfectly, because 5 times 12 inches equals 60 inches and 2 times 20 inches equals 40 inches. Although even layers would not fit perfectly, because 3 times 20 inches equals 60 inches and 3 times 12 inches equals 36 inches, the loss is significantly less than that of the GMA pallet.

The cargo vehicle of the present invention can suit either the standard GMA 40 inch by 48 inch pallet or a specialized 40 inch by 60 inch pallet, because the elevator systems of the present invention, built to accommodate standard trailer widths, may be constructed to have a spacing of approximately 40 inches between opposite pallet support shelves.

Figure 8:
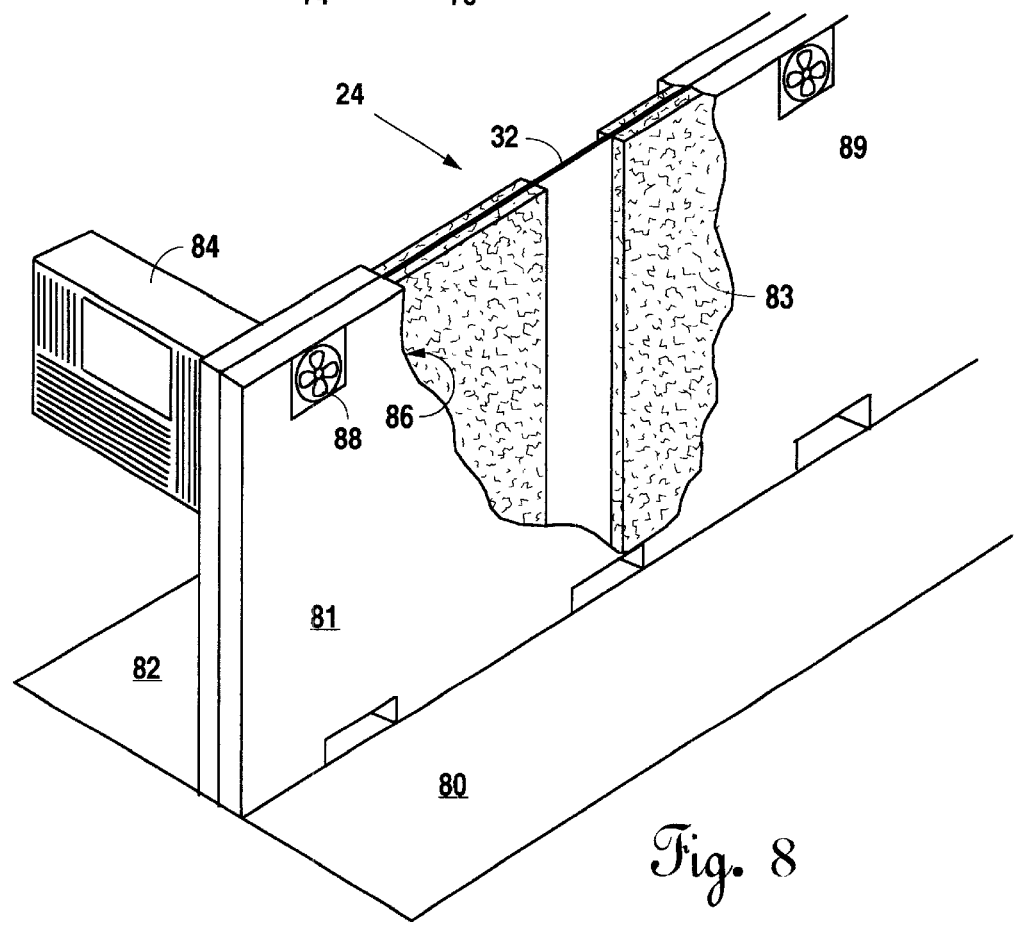
FIG. 8 is a perspective view of an integral cooling system located within a structural center wall.

FIG. 8 illustrates one embodiment of a center structural wall 24 comprising a skin 32 bounded on either side by insulating material 83, and outer skins 81. The center structural wall 24 divides the cargo area into two temperature zones 80 and 82, with the center wall 24 forming two heat exchange cavities 86 to insure proper temperature control in the warmer of the two zones 80 and 82. The skin 32 may be made of one or more suitable materials, such as fiberglass-coated plywood or insulating foam boards layered with aluminum siding, that are both lightweight and durable.

Temperature is maintained in the cold cargo zone 82 by mechanical phase change refrigeration equipment 84 installed at the head of the cold cargo zone 82. Temperature in the warmer cargo zone 80 is controlled through the use of the heat exchange cavities 86 between the skin 32 and the outer skins 81, and thermostatically-controlled fans 88 and 89. Warm air from the top of the warmer cargo zone 80 is blown. into the heat exchange cavities 86 by fan 88. The warm air loses heat as it descends in cavity 86. The cooler air is then blown back into the warm zone 80 by fan 89, thus reducing the temperature of the air in the warm zone 80.

The delivery vehicle of the present invention can be further enhanced by incorporating a mechanism for raising or lowering the rear of the vehicle to a desired dock height, such as the standard 48 inch dock height. Such an enhancement is illustrated in FIGS. 9a and 9b. FIG. 9a shows a trailer 90 backed up to the dock 96 for loading. One can readily see a disparity in the height of the floor 92 of the trailer 90 and that of the dock 96. A height adjustment may be made by utilizing an elevating and supporting mechanism 94 connected to the trailer bottom. The mechanism is capable of descending to the ground and raising the trailer floor to the desired dock height (as shown in FIG. 9b). Those skilled in the art will recognize that there many acceptable methods to actuate the elevating and supporting mechanism 94 from its retracted position in FIG. 9a to its extended position in FIG. 9b. These actuators can be strictly mechanical or strictly hydraulic, or a combination of mechanical and hydraulic.

Figure 10A:
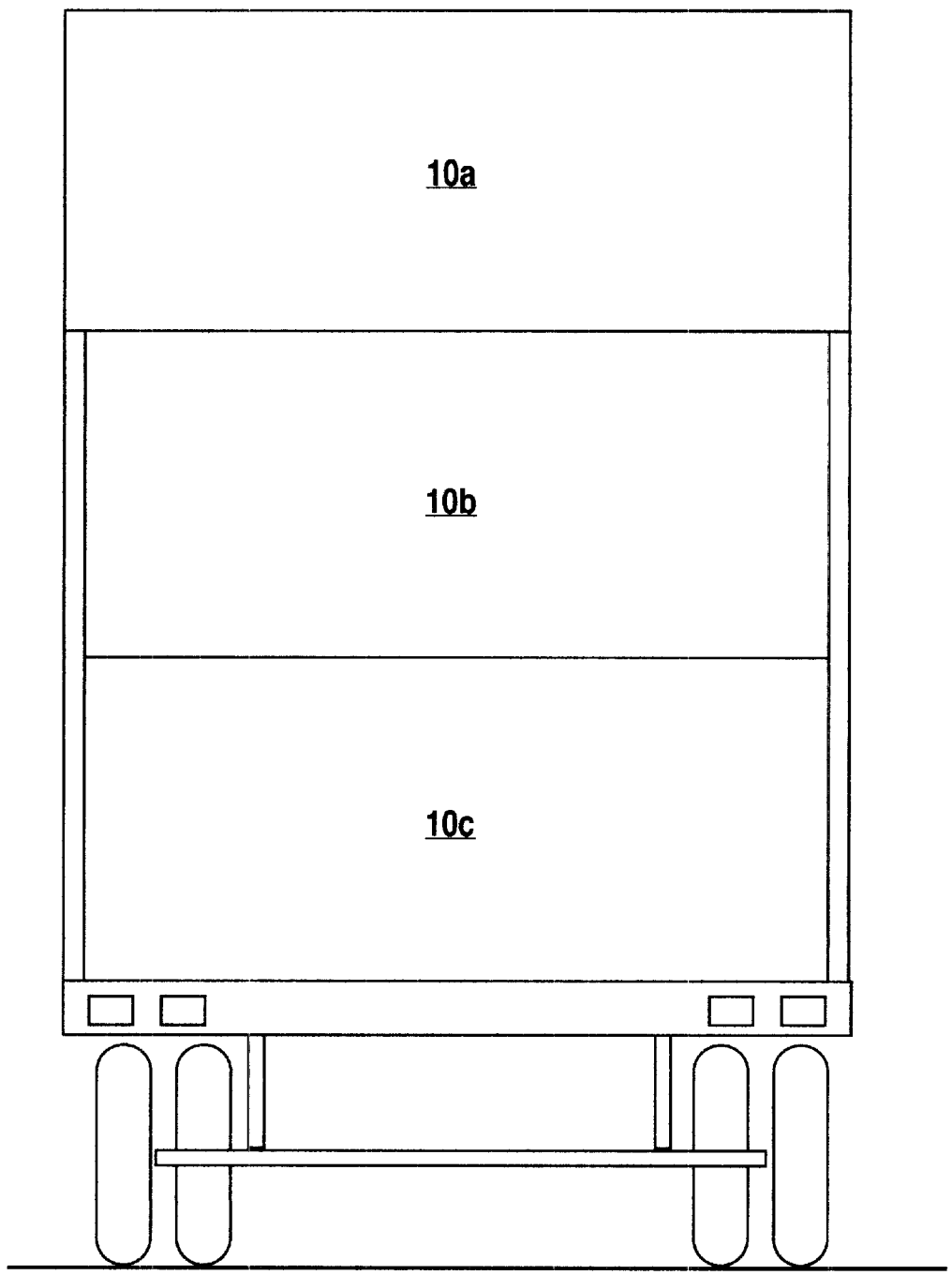
FIG. 10a is a rear view of sliding rear doors in a lowered position.
Figure 10B:
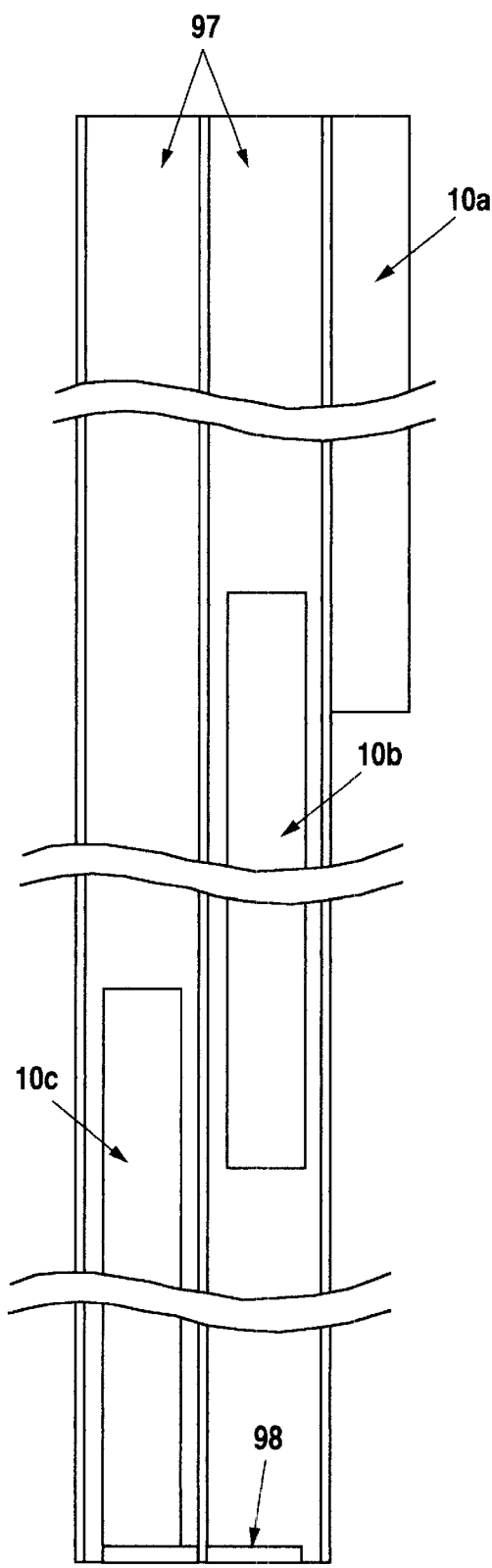
FIG. 10b is a side view of sliding rear doors in a lowered position.
Figure 10C:
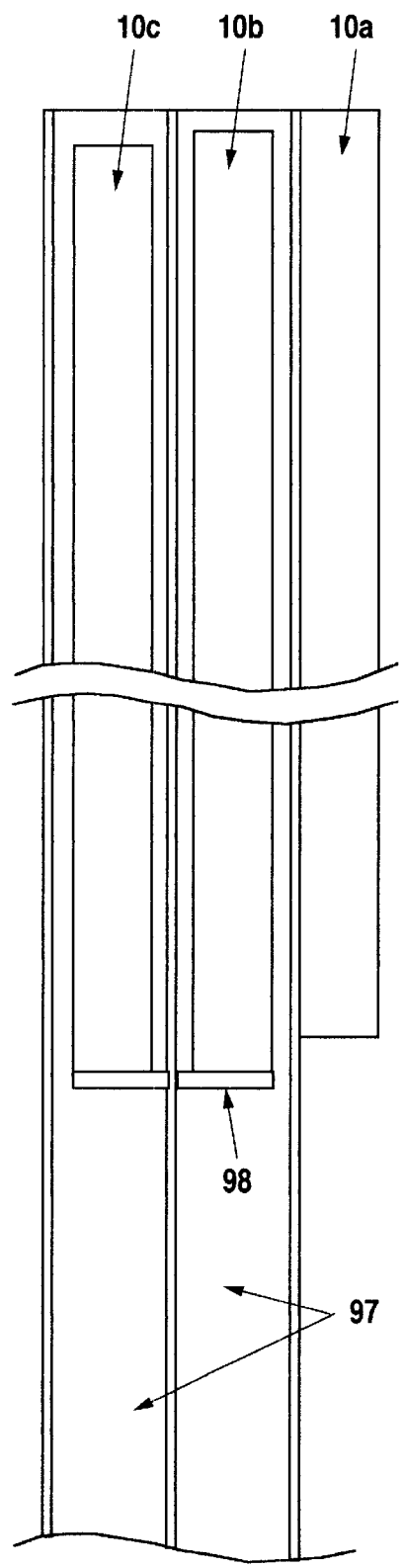
FIG. 10c is a side view of sliding rear doors in a raised position.

The food service industry is accustomed to trailers having a sliding sectional rear door that slides up and under the ceiling of the trailer, like a typical garage door. In embodiments built in accordance with the embodiment of FIG. 3b, a traditional sliding rear door may interfere with the structural support frame 28. FIGS. 10a, 10b, and 10c illustrate one embodiment of a functional substitute for traditional sliding sectional rear doors. In this embodiment, a vertically sliding rear access door is provided which is divided into three panels. A moveable lower panel 10c slides upwardly in vertical tracks 97 until its panel lip 98 reaches the bottom of a moveable intermediate panel 10b, at which time both lower and intermediate panels 10c and 10b travel upwardly in their vertical tracks 97 until they are concealed behind an overlapping fixed upper panel 10a. The reverse process takes place to lower the panels.

There are many other advantages provided by the exemplary embodiments of the present invention.

While particular embodiments of the invention have been illustrated and described, it will be obvious to those skilled in the art that various changes and modifications may be made without sacrificing the advantages provided by the principles of construction or methods disclosed therein.

Having described our invention, we claim:

1. A delivery vehicle with multi-tier cargo storage, comprising:
    an elevator assembly for raising and lowering cargo between different storage tiers, said elevator assembly comprising:
        at least one platform movable between an intermediate position and a lowered position; and
        a lift for raising and lowering the at least one platform to permit loading and unloading of cargo; and
    a plurality of support members longitudinally bisecting the delivery vehicle, the support members being coupled to said elevator assembly for transferring substantially all cargo weight from the elevator assembly directly to an axle of the delivery vehicle.

2. The delivery vehicle of claim 1, further comprising a plurality of independently operable elevator assemblies disposed in said vehicle.

3. The delivery vehicle of claim 1, wherein said plurality of support members further comprise a plurality of transverse diagonal braces.

4. The delivery vehicle of claim 1, further comprising a retractable elevating support connected to a bottom of said delivery vehicle and operable to raise a floor of said vehicle to a selected docking height.

5. A delivery vehicle with multi-tier cargo storage, comprising:
    an elevator assembly for raising and lowering cargo between different storage tiers, said elevator assembly comprising:
        at least one platform movable between an intermediate position and a lowered position;
        a lift for raising and lowering the at least one platform to permit loading and unloading of cargo; and
        a lifting mechanism comprising a plurality of chains mated to a sprocketed cross shaft to raise and lower each of the plurality of chains by equal amounts; and
    a plurality of support members coupled to said elevator assembly for transferring substantially all cargo weight from the elevator assembly directly to an axle of the delivery vehicle.

6. The delivery vehicle of claim 5, further comprising a ratchet and pawl mechanism coupled to said cross shaft to prevent the platform from falling if the lifting mechanism fails.

7. A delivery vehicle with mult-tier cargo storage, comprising:
    an elevator assembly for raising and lowering cargo between different storage tiers, said elevator assembly comprising:
        at least one platform movable between an intermediate position and a lowered position; and
        a lift for raising and lowering the at least one platform to permit loading and unloading of cargo;
    a plurality of support members coupled to said elevator assembly for transferring substantially all cargo weight from the elevator assembly directly to an axle of the delivery vehicle; and
    a sliding rear access door comprising a plurality of panels that slide vertically between an open position and a closed position, wherein said panels overlap each other in said open position.

8. A delivery vehicle with multi-tier cargo storage, comprising:
    an elevator assembly for raising and lowering cargo between different storage tiers, said elevator assembly comprising:
        a platform movable between an intermediate position and a lowered position; and
        a lift for raising and lowering the platform to permit loading and unloading of cargo; and
    a plurality of side access doors in at least one side of the delivery vehicle, said access doors being positioned so as to permit cargo loading and unloading at the platform of the elevator assembly when said platform is in its lowered position.

9. The delivery vehicle of claim 8, further comprising a plurality of independently operable elevator assemblies disposed in said vehicle.

10. The delivery vehicle of claim 8, wherein said platform comprises a plurality of support shelves.

11. The delivery vehicle of claim 10, wherein said support shelves support a pallet.

12. The delivery vehicle of claim 11, wherein said pallet comprises a plurality of self-guiding rollers for rolling said pallet along said plurality of support shelves.

13. The delivery vehicle of claim 11, wherein said pallet comprises at least one dead bolt for locking said pallet to said support shelves and for resisting movement of said pallet with respect to said delivery vehicle.

14. The delivery vehicle of claim 11, wherein said pallet is adapted to support cargo having horizontal dimensions of 40 by 60 inches.

15. The delivery vehicle of claim 8, further comprising a stabilizing means for preventing movement of the platform from side to side.

16. A delivery vehicle for storing and transporting multiple tiers of cargo, comprising:
   an enclosed cargo section positioned generally above a plurality of weight-bearing axles, said cargo section further comprising:
   a roof;
   first and second side walls connected to said roof;
   a plurality of side doors collectively penetrating a substantial portion of a lower half of each side wall;
   a structural support frame disposed in said enclosed cargo section and having a center portion longitudinally bisecting the cargo section along a transverse dimension thereof, said center portion being in primary load-bearing communication with at least one of said plurality of weight-bearing axles; and
   at least one elevating platform located on either side of the center portion of said structural support frame within said enclosed cargo section.

17. The delivery vehicle of claim 16, further comprising a sliding rear access door comprising a plurality of panels that slide vertically between an open position and a closed position, wherein said panels overlap each other in said open position.

18. The delivery vehicle of claim 16, wherein first and second skins are affixed respectively on first and second sides of the center portion of said structural support frame, thereby forming a center wall defining first and second cargo zones.

19. The delivery vehicle of claim 18, wherein a cavity between the first and second skins of the center wall forms a heat exchange chamber.

20. The delivery vehicle of claim 19, further comprising refrigeration equipment for cooling at least one of said first and second cargo zones.

21. The delivery vehicle of claim 20, further comprising at least one fan for circulating air between said first cargo zone and said heat exchange chamber.

22. The delivery vehicle of claim 16, wherein the structural support frame further comprises:
   first and second side portions connected respectively to the first and second side walls of the delivery vehicle; and
   a plurality of transverse diagonal braces extending from upper outboard corners of said first and second side portions to a vertically intermediate area of the center portion of the structural support frame, wherein said diagonal braces transfer a substantial portion of cargo load to the center portion of the structural support frame.

* * * * *